(12) United States Patent
Shaffer

(10) Patent No.: US 6,804,652 B1
(45) Date of Patent: Oct. 12, 2004

(54) METHOD AND APPARATUS FOR ADDING CAPTIONS TO PHOTOGRAPHS

(75) Inventor: John Handley Shaffer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 09/676,907

(22) Filed: Oct. 2, 2000

(51) Int. Cl.[7] .............................................. G10L 15/00
(52) U.S. Cl. ..................................... 704/270; 396/300
(58) Field of Search .............................. 704/270, 246, 704/275; 396/300, 297

(56) References Cited

U.S. PATENT DOCUMENTS 6,134,392 A * 10/2000 Gove ......................... 396/296
6,401,069 B1 * 6/2002 Boys et al. ................. 704/275

* cited by examiner

Primary Examiner—Daniel Abebe
(74) Attorney, Agent, or Firm—Joan Pennington

(57) ABSTRACT

A method and apparatus are provided for adding captions to photographs. An apparatus for adding captions to photographs includes a medium for storing a photograph image. A microphone is provided for receiving user spoken words. A voice recognition system is coupled to the microphone for generating text unit instructions. A caption generation unit is coupled to the voice recognition system for storing a caption with the photograph image on said medium. Both a film camera system and a digital camera system are used for adding captions to photographs. In the film camera system, the caption is simultaneously stored with the photograph image on photographic film. In the digital camera system, the caption can be simultaneously stored with the photograph image on digital storage medium or can be added at an earlier time or a later time.

9 Claims, 4 Drawing Sheets

METHOD AND APPARATUS FOR ADDING CAPTIONS TO PHOTOGRAPHS

FIELD OF THE INVENTION

The present invention relates generally to the data processing field, and more particularly, relates to a method and apparatus for adding captions to photographs.

DESCRIPTION OF THE RELATED ART

Currently in the market, cameras are available which have a built-in mechanism that creates an image on photographs of the date and/or time. The date and/or time are imprinted on the negative itself and show when the photograph was taken. A problem is that this is only a small amount of information. There is no other identifying information on the exposure except for the image itself along with the date and/or time.

A need exists for a method and apparatus for adding captions to photographs. It is desirable to provide captions to be imprinted on the film and photograph in a manner that is easy for a user to use. As used in the following specification and claims, the term caption means user defined information to be imprinted on film. A need exists for a method and apparatus for adding captions to photographs that enables a user to provide custom captions to be imprinted on film when a picture is being taken.

SUMMARY OF THE INVENTION

A principal object of the present invention is to provide a method and apparatus for adding captions to photographs. Other important objects of the present invention are to provide such method and apparatus for adding captions to photographs substantially without negative effect and that overcome many of the disadvantages of prior art arrangements.

In brief, a method and apparatus are provided for adding captions to photographs. An apparatus for adding captions to photographs includes a medium for storing a photograph image. A microphone is provided for receiving user spoken words. A voice recognition system is coupled to the microphone for generating text unit instructions. A caption generation unit is coupled to the voice recognition system for storing a caption with the photograph image on the medium.

In accordance with features of the invention, a film camera system and a digital camera system are used for adding captions to photographs. In the film camera system, the caption is simultaneously stored with the photograph image on photographic film. In the digital camera system, the caption can be simultaneously stored with the photograph image on digital storage medium or can be added at an earlier time or a later time.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
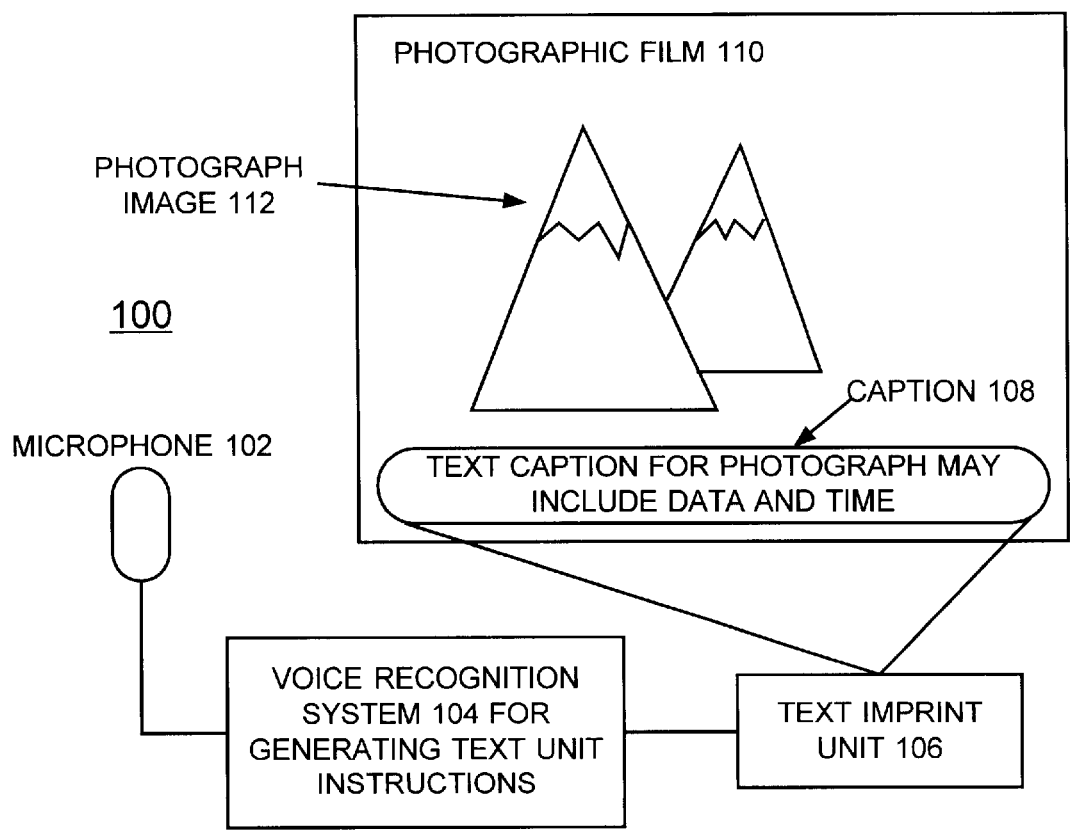
FIG. 1 is a block diagram representation illustrating a system for adding captions to photographs with a film camera in accordance with the preferred embodiment.

Having reference now to the drawings, in FIG. 1, there is shown a film camera system of the preferred embodiment generally designated by the reference character 100. As shown in FIG. 1, film camera system 100 of the preferred embodiment includes a microphone 102 coupled to a voice recognition system 104 for generating text unit instructions. The voice recognition system 104 is coupled to a text imprint unit 106. In conventional film cameras, the text imprint unit 106 typically generates a simple multisegment image capable of creating alpha-numeric for the date and time. The text imprint unit 106 of the preferred embodiment is able to create an alpha-numeric image or caption 108 on a photographic film 110 simultaneously with an image 112 or picture being taken. The caption 108 includes the text unit instructions generated by the voice recognition system 104 responsive to the user's spoken words when a picture is being taken.

Figure 2:
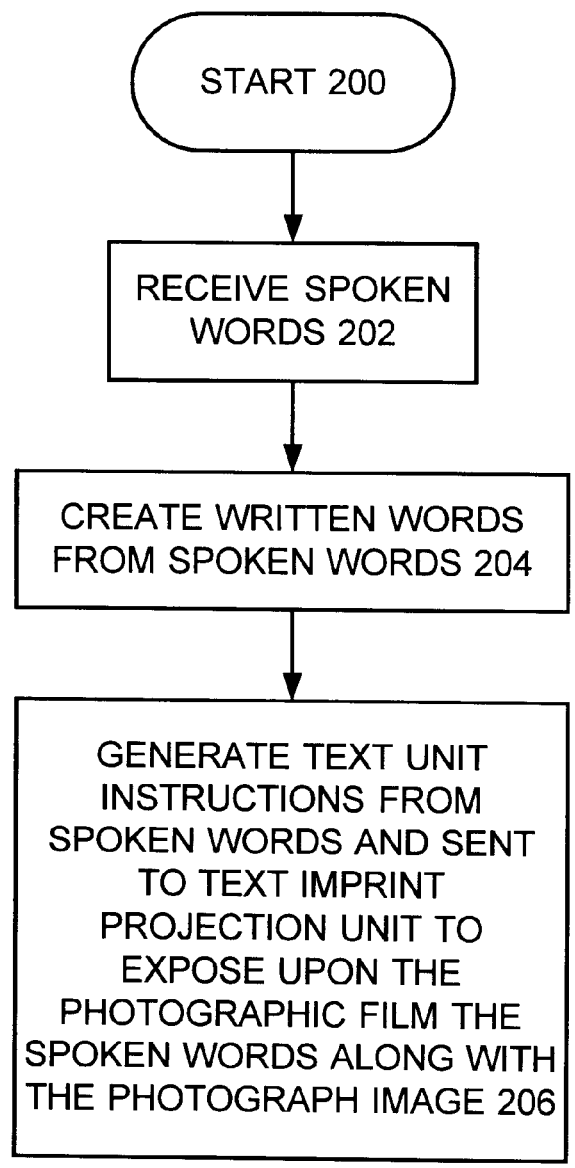
FIG. 2 is a flow chart illustrating exemplary sequential steps for adding captions to photographs with a film camera of FIG. 1 in accordance with the preferred embodiment.

Referring to FIG. 2, exemplary sequential steps are shown for adding captions to photographs with a film camera 100 in accordance with the preferred embodiment starting at block 200. Spoken words from a user are received by the voice recognition system 104 for a next photograph to be taken as indicated in a block 202. Written words are created from the spoken words by the voice recognition system 104 as indicated in a block 204. Text unit instructions are generated by the voice recognition system 104 and sent to the text imprint unit 106 to expose upon the photographic film 110 the spoken words along with the photograph image of the current picture being taken as indicated in a block 206.

Figure 3:
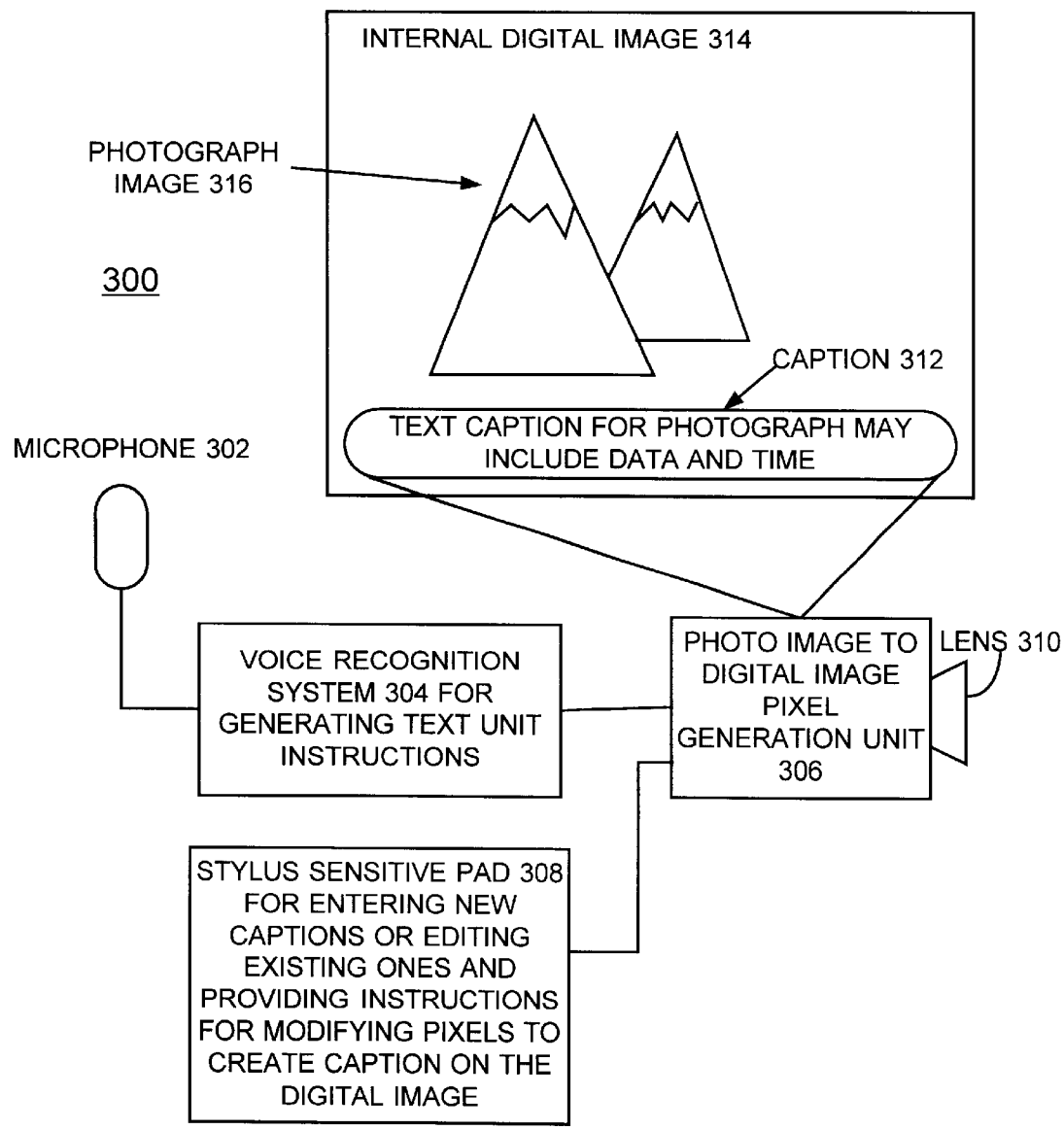
FIG. 3 is a block diagram representation illustrating a system for adding captions to photographs with a digital camera in accordance with the preferred embodiment.

Having reference now to the drawings, in FIG. 3, there is shown a digital camera system of the preferred embodiment generally designated by the reference character 300. As shown in FIG. 3, digital camera system 300 of the preferred embodiment includes a microphone 302 coupled to a voice recognition system 304 for generating text unit instructions. The voice recognition system 304 is coupled to a photo image to digital image pixel generation unit 306. A stylus sensitive pad 308 is used by a user for entering a new captions or editing existing captions 312. The user can enter a new caption while taking a photograph image, or before or after the photograph image is taken. The digital image pixel generation unit 306 includes a lens 310 for capturing a picture or a photograph image 316. The digital image pixel generation unit 306 of the preferred embodiment is able to create an alpha-numeric image or caption 312 on an internal digital image 314 together with a photograph image 316 or picture being taken. The caption 312 includes the text unit instructions generated by the voice recognition system 304 responsive to the user's spoken words when a picture is being taken and instructions generated by the stylus sensitive pad 308 for modifying pixels to create a new caption 312 or editing an existing caption 312. As the picture is being taken as described above with respect to the film camera system 100, or at a later time, such as when reviewing pictures stored in the internal digital image memory 110, captions 312 can be added, changed, edited and the like.

In the film camera system 100 and the digital camera system 300, various commercially available microphones can be used for microphone 102 and 302. The voice recognition system 104 and 304 can be implemented with a signal processor, such as a digital signal processor (DSP) chip.

Figure 4:
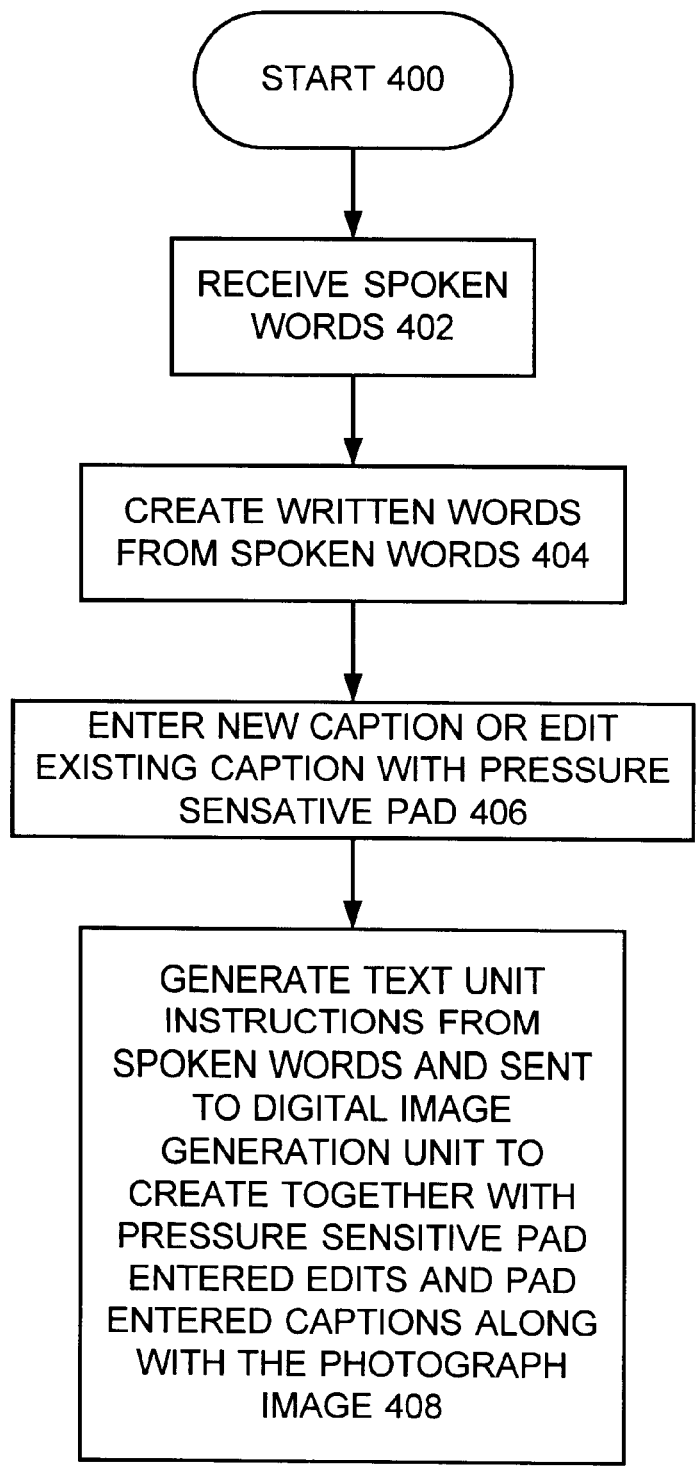
FIG. 4 is a flow chart illustrating exemplary sequential steps for adding captions to photographs with a digital camera of FIG. 3 in accordance with the preferred embodiment.

Referring to FIG. 4, exemplary sequential steps are shown for adding captions to photographs with a digital camera 300 in accordance with the preferred embodiment starting at block 400. Spoken words from a user are received by the voice recognition system 304 as indicated in a block 402. Written words are created from the spoken words by the voice recognition system 304 as indicated in a block 404. A new caption is entered or an existing caption edited by the user with the stylus sensitive pad 308 as indicated in a block 406. Text unit instructions are generated by the voice recognition system 304 and sent to the digital image pixel generation unit 306 together with instructions generated by the stylus sensitive pad 308 to create the text caption 312 from spoken words and pad entered new or edited captions along with the photograph image of the current picture being taken or a picture being reviewed as indicated in a block 408.

While the present invention has been described with reference to the details of the embodiments of the invention shown in the drawing, these details are not intended to limit the scope of the invention as claimed in the appended claims.

What is claimed is:

1. An apparatus for adding captions to photographs comprising:
   a digital image storage medium for storing a photograph image;
   a microphone for receiving user spoken words;
   a voice recognition system coupled to said microphone for generating text unit instructions;
   a caption generation unit coupled to said voice recognition system for storing a caption with said photograph image on said medium;
   a pad for entering new captions or editing existing captions, said pad coupled to said caption generation unit; and
   wherein said caption generation unit stores said caption with said photograph image while storing said photograph image or stores said caption with laid photograph image at a later time after said photograph image has been stored.

2. An apparatus for adding captions to photographs as recited in claim 1 wherein said caption generation unit coupled to said voice recognition system for storing a caption with said photograph image on said medium simultaneously stores said caption with said photograph image.

3. An apparatus for adding captions to photographs as recited in claim 1 wherein said voice recognition system includes a digital signal processor (DSP) chip.

4. An apparatus for adding captions to photographs as recited in claim 1 wherein said medium for storing a photograph image includes an internal digital image storage medium.

5. An apparatus for adding captions to photographs as recited in claim 1 wherein said caption generation unit includes a text imprint projection unit.

6. An apparatus for adding captions to photographs as recited in claim 1 wherein said caption generation unit includes a digital image pixel generation unit and said medium for storing a photograph image includes a digital image memory for storing said photograph image and said caption.

7. A method for adding captions to photographs comprising the steps of:
   providing a digital image storage medium for storing a photograph image and a caption;
   receiving user spoken words;
   generating text unit instructions responsive to said received user spoken words;
   storing a caption responsive to said text unit instructions with a photograph image on said digital image storage medium using a caption generation unit;
   receiving user pad entries for entering another caption or modifying said stored caption; and
   wherein said caption generation unit stores said caption with said photograph image while storing said photograph image or stores said caption with said photograph image at a later time after said photograph image has been stored.

8. A method for adding captions to photographs as recited in claim 7 further includes the step of storing said another caption or said modified caption with said photograph image on said digital storage medium.

9. A method for adding captions to photographs as recited in claim 7 wherein the step of storing a caption responsive to said text unit instructions with a photograph image on said medium includes the step of simultaneously storing said caption responsive to said text unit instructions with said photograph image on said medium responsive to capturing said photograph image.

* * * * *